(12) United States Patent
Gammon et al.

(10) Patent No.: US 7,069,061 B2
(45) Date of Patent: Jun. 27, 2006

(54) SPEAKER ASSEMBLIES AND MOBILE TERMINALS INCLUDING THE SAME

(75) Inventors: John Weldon Gammon, Raleigh, NC (US); William Chris Eaton, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 255 days.

(21) Appl. No.: 10/622,398

(22) Filed: Jul. 18, 2003

(65) Prior Publication Data

US 2005/0014537 A1   Jan. 20, 2005

(51) Int. Cl.
    *H04M 1/00* (2006.01)
(52) U.S. Cl. ............... 455/575.1; 455/569.1; 381/89; 381/355; 381/386
(58) Field of Classification Search ............ 455/569.1, 455/575.1, 90, 550; 381/93, 409, 89, 335, 381/386, 182, 186
    See application file for complete search history.

(56) References Cited

U.S. PATENT DOCUMENTS

| 3,922,488 A | * | 11/1975 | Gabr ..................... 381/93 |
| 5,201,069 A | * | 4/1993 | Barabolak ............. 455/575.1 |
| 2002/0042287 A1 | * | 4/2002 | Asami ..................... 455/550 |
| 2003/0003879 A1 | * | 1/2003 | Saiki et al. .............. 455/90 |
| 2003/0095680 A1 | * | 5/2003 | Kim et al. ............... 381/409 |
| 2004/0023697 A1 | * | 2/2004 | Komura ................. 455/569.1 |

FOREIGN PATENT DOCUMENTS

| WO | WO 02/28064 | 4/2002 |
| WO | WO 03/028404 | 4/2003 |

OTHER PUBLICATIONS

International Search Report, PCT/IB2004/000082, Date of mailing May 7, 2004.

* cited by examiner

*Primary Examiner*—Jean Gelin
*Assistant Examiner*—Phuoc Doan
(74) *Attorney, Agent, or Firm*—Myers Bigel Sibley & Sajovec

(57) ABSTRACT

Mobile terminals include a housing, an electronic circuit and a speaker assembly positioned in the housing. The speaker assembly includes a first speaker positioned adjacent a first side of the electronic circuit and a second speaker positioned adjacent the first speaker on the first side of the electronic circuit. A grommet may be positioned in the housing that is configured to receive the first speaker and the second speaker and the first speaker and the second speaker are positioned in the grommet. The first speaker can be a receiver speaker and the second speaker can be a microspeaker.

31 Claims, 8 Drawing Sheets

SPEAKER ASSEMBLIES AND MOBILE TERMINALS INCLUDING THE SAME

BACKGROUND OF THE INVENTION

The present invention relates to audio systems for personal use, such as in mobile terminals and, more particularly, to speaker assemblies.

Manufacturers and designers of personal electronic devices, such as cellular radio telephones, frequently seek to reduce the overall dimensions of such devices while maintaining attractive style characteristics for the devices. One consequence of the reduced size for such devices that include a speaker is that less space may be available for the speaker. Furthermore, a variety of audio signal generation capabilities may be desired in such personal electronic devices including buzzers, voice signal generation and/or music or other higher frequency band signal reproduction and playback. Some devices include a second speaker to provide this added functionality.

As the space available for the hardware supporting the audio signal generation capabilities decreases in the personal electronic devices, it may become more difficult to support multiple sound emitting output devices and the space available for each such device may become smaller. Furthermore, increased functionality in such personal electronic devices may require more of the reduced available space to be utilized for other functionality of the device. The reduction in the size of the audio output devices may also increase the difficulty of providing a desirable loudness level for signals, such as buzzer alert signals.

One approach to providing a range of volumes in a handheld device is to use a clamshell device, such as a flip phone, including a switch indicating when the flip phone is in the open position. Responsive to the switch detecting opening of the flip phone, the acoustic level of the speaker may be lowered assuming the user is about to place the device near the user's ear. However, clamshell devices not equipped with such switches and non-clamshell type designs typically do not have the ability to anticipate that the phone is about to be moved to the user's ear. Instead, the speaker volume may be a compromise level that may result in high peak acoustic levels to a user at the earpiece or lower than desirable alerting levels as discussed above.

Some other handset device designs may include two separate speakers that are positioned in separate areas of the device. Typically, the earpiece acoustic first speaker is positioned adjacent the front face of the device by the earpiece and the second speaker, that may provide added audio functionality, is positioned under the keypad or battery or in the antenna volume as a rear-firing speaker with its own, separate, acoustic channels. However, the size of a device including two remotely located speakers may be increased to accommodate both speakers and their related acoustic channels. Such devices may also experience acoustic coupling of the speakers that may, in turn, cause increased acoustic echo.

SUMMARY OF THE INVENTION

Embodiments of the present invention provide mobile terminals including a housing and an electronic circuit positioned in the housing. A first speaker is positioned adjacent a first side of the electronic circuit and a second speaker is positioned adjacent the first speaker on the first side of the electronic circuit. A grommet may be positioned in the housing that is configured to receive the first speaker and the second speaker and the first speaker and the second speaker are positioned in the grommet.

In some embodiments of the present invention, the first speaker may include a receiver speaker and the second speaker may include a micro-speaker. The receiver speaker may have a DC resistance at least about two times a DC resistance of the micro-speaker. The DC resistance of the receiver speaker may be about 32 ohms and the DC resistance of the micro-speaker may be about 8 ohms.

In further embodiments of the present invention, the grommet may be configured to provide a seal between a front face of the first speaker and a back face of the first speaker and between a front face of the second speaker and a back face of the second speaker. In certain embodiments of the present invention, the housing may include a front face including a keypad and an earpiece. The first speaker and the second speaker may be positioned between the electronic circuit and the front face.

The electronic circuit may include a printed circuit board. The mobile terminal may further include a first passageway acoustically coupling the front face of the first speaker to the earpiece. The mobile terminal may further include a seal between a first face of the grommet and the front face of the housing and a seal between a second face of the grommet and the first side of the printed circuit board.

In still further embodiments of the present invention, the mobile terminal may further include a second passageway acoustically coupling the front face of the second speaker to an opening in a face of the housing remote from the earpiece. The grommet may define the first and second passageways. In certain embodiments of the present invention, the opening remote from the earpiece may be positioned on a side face of the housing.

In some embodiments of the present invention, the first passageway may include a first high frequency forward tuning volume adjacent the front face of the first speaker and the second passageway may include a second high frequency forward tuning volume adjacent the front face of the second speaker. The mobile terminal may further include a first low frequency back tuning volume adjacent the back face of the first speaker and a second low frequency back tuning volume adjacent the back face of the second speaker.

In further embodiments of the present invention, the grommet may further include an opening extending through the grommet that acoustically couples the first forward tuning volume and the first low frequency back tuning volume. The first passageway may acoustically couple the front face of the first speaker and the back face of the first speaker to the earpiece. In certain embodiments, the grommet may further include a seal member between a face of the grommet adjacent the front face of the first speaker and the front face of the housing and the seal member may include a slit. A bottom of the front face of the housing may include a groove adjacent the front face of the first speaker and the slit may be configured to align with the groove to define a third passageway that acoustically couples the front face of the first speaker and the first forward tuning volume.

In still further embodiments of the present invention, the mobile terminal may further include a mounting member between the front face of the housing and a back face of the housing. The printed circuit board may be positioned between the front face of the housing and the mounting member.

In some embodiments of the present invention, there may be at least one opening extending through the printed circuit board adjacent the back face of the first speaker that acoustically couples the back face of the first speaker to a region of the first back tuning volume defined by the printed circuit board and the mounting member.

In further embodiments of the present invention, a planar antenna may be positioned in the housing between the mounting member and the back face of the housing. In certain embodiments of the present invention, there may be least one opening extending through the printed circuit board adjacent the back face of the second speaker that acoustically couples the back face of the second speaker to a first region of the second back tuning volume defined by the printed circuit board and the mounting member. The mobile terminal may further include a second region of the second back tuning volume defined by the mounting member and the planar antenna and at least one opening extending through the mounting member between the first region and the second region of the second back tuning volume.

In still further embodiments of the present invention, the grommet may be configured to provide seals for the first passageway and the second passageway and the first back tuning volume and the second back tuning volume to suppress acoustic echo in the housing by reducing leakage from the second passageway and the first and second back tuning volumes past the earpiece.

In some embodiments of the present invention, the mobile terminal may include a seal between a second side of the printed circuit board and a first face of the mounting member that substantially closes the first back tuning volume and seals between a second side of the printed circuit board and a first face of the mounting member and between a first face of the planar antenna and a second face of the mounting member that substantially closes the second back tuning volume.

In further embodiments of the present invention, the seal between the second side of the printed circuit board and the first face of the mounting member may include a plastic to plastic seal. In certain embodiments of the present invention, the seals between a second side of the printed circuit board and a first face of the mounting member and between a first face of the planar antenna and a second face of the mounting member may include a plastic to plastic seal. In certain embodiments of the present invention, the seals between the printed circuit board and the planar antenna and the mounting member may further include an adhesive layer.

In still further embodiments of the present invention, the printed circuit board may define a ground plane. Furthermore, the planar antenna may be substantially parallel to and electrically coupled to the printed circuit board and positioned at a selected distance from the ground plane to provide a desired frequency response of the planar antenna.

In some embodiments of the present invention, the mobile terminal may include spring connectors that electrically couple the first speaker to the first side of the electronic circuit and that electrically couple the second speaker to the first side of the electronic circuit.

In further embodiments of the present invention, the opening remote from the earpiece may have an area of less than about 10 square millimeters (mm$^2$). In certain embodiments of the present invention, a filter may be provided in the opening remote from the earpiece. The filter may be a foam insert.

In still further embodiments of the present invention, the grommet may include a first member configured to receive the first speaker and to provide a seal between a front face of the first speaker and a back face of the first speaker. The grommet may further include a second member configured to receive the second speaker and to provide a seal between a front face of the second speaker and a back face of the second speaker. In certain embodiments of the present invention, the first and second members may include a unitary member.

In some embodiments of the present invention, the first speaker and the second speaker may have a diameter of from about 10 millimeters (mm) to about 20 mm. The mobile terminal may further include a receiver that receives encoded audio signals from a wireless communications network and a controller that decodes the received audio signals and selectively provides the decoded audio signals to the first speaker and/or the second speaker.

Some embodiments of the present invention provide mobile terminals including a housing including a front face having a keypad and an earpiece. The mobile terminal further includes an electronic circuit positioned in the housing, a first speaker positioned between a first side of the electronic circuit in the housing and the front face adjacent the earpiece and a grommet positioned in the housing. The grommet includes the first speaker and is configured to provide seals on acoustic passageways associated with the first speaker between a front face and a back face of the first speaker, between the front face of the housing and the front face of the first speaker and between the back face of the first speaker and the first side of the electronic circuit so as to suppress acoustic echo in the housing by reducing leakage from the acoustic passageways past the earpiece. The acoustic passageways include a forward acoustic passageway acoustically coupling the first speaker to the earpiece.

Further embodiments of the present invention provide a speaker assembly including a grommet defining adjacent first and second receiving chambers. The assembly further includes a first speaker positioned in the first receiving chamber and a second speaker positioned in the second receiving chamber. The grommet is configured to provide a seal between a front face of the first speaker and a back face of the first speaker and between a front face of the second speaker and a back face of the second speaker.

In some embodiments of the present invention, the grommet may be further configured to define a first acoustic passageway extending from the first chamber to an outer face of the grommet and a second acoustic passageway extending from the second chamber to an outer face of the grommet at a location remote from the first acoustic passageway. In certain embodiments of the present invention, the grommet has a first face configured to provide a seal between the grommet and a substantially planar member and a second face, opposite the first face, configured to provide a seal between the grommet and a substantially planar member. The grommet may also include a unitary elastomeric member.

DETAILED DESCRIPTION

Figure 1:
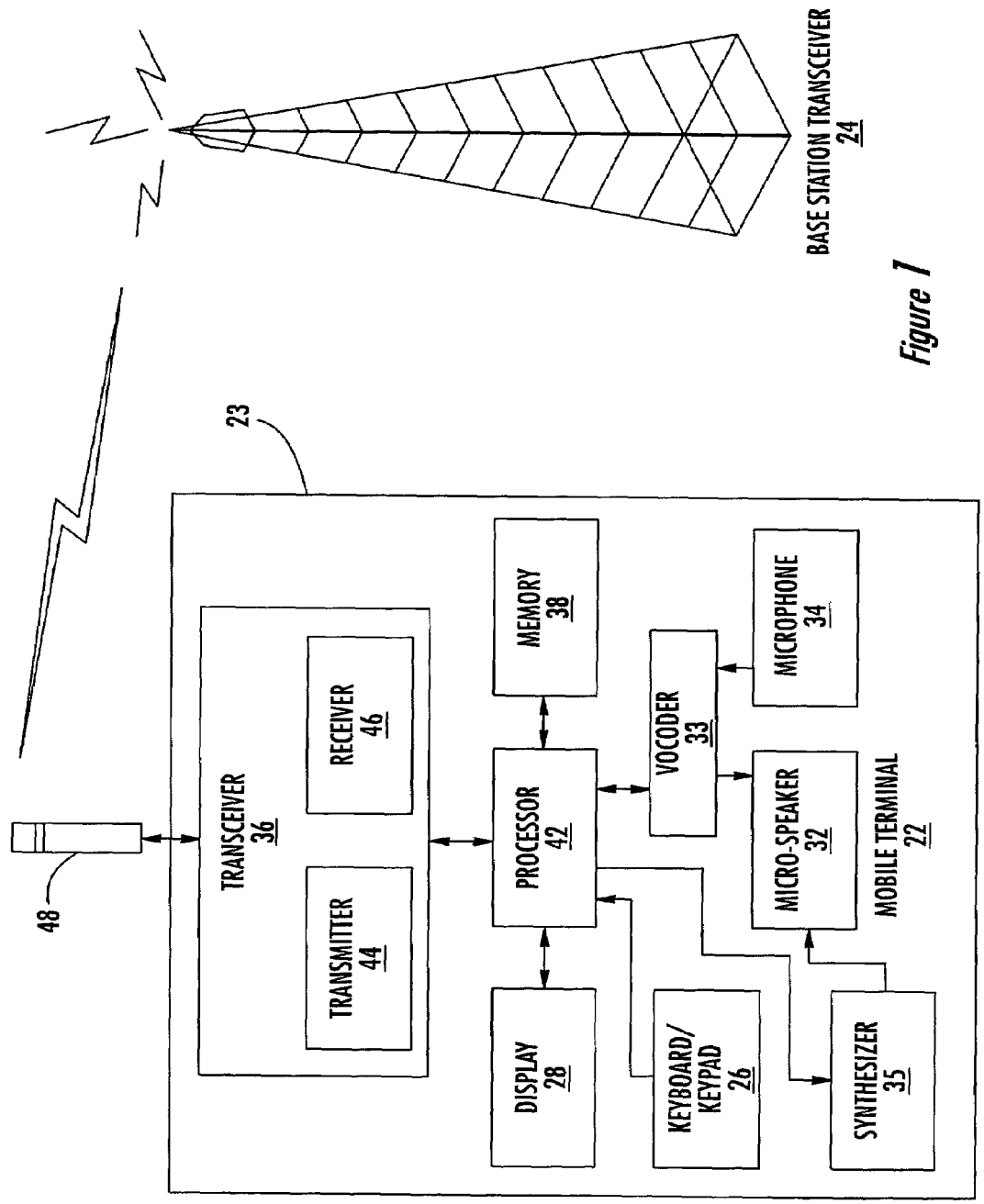
FIG. 1 is a schematic block diagram illustrating a mobile terminal including a speaker assembly according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that although the terms first and second are used herein to describe various elements, these elements should not be limited by these terms. These terms are only used to distinguish one element from another element. Thus, a first element discussed below may be termed a second element, and similarly, a second element may be termed a first element without departing from the teachings of the present invention.

The present invention will be described below with respect to some embodiments of the invention illustrated in FIGS. 1 through 10. Embodiments of the present invention provide speaker assemblies and mobile terminals including a speaker assembly having a first speaker and a second speaker positioned on a first side of an electronic circuit, for example, a printed circuit board. The first side in some embodiments is the front side of the electronic circuit, which may allow placement of the speaker assembly adjacent a user earpiece in the front face of the device. Positioning both the first speaker and the second speaker on the same side of the electronic circuit may allow the size of the device in which the first speaker and the second speaker are positioned to be reduced or may allow more room within the device for other components and/or features.

In certain embodiments of the present invention the first speaker and the second speaker each include independent front and back volumes, which may minimize acoustic coupling between the first speaker and the second speaker as there is no intentional leakage past an earpiece of the device. The reduction in the acoustic coupling of the speakers may also reduce the amount of acoustic echo experienced by the user. As will be further described below, the first speaker and the second speaker may be sealed and isolated from one another by including the first speaker and the second speaker in, for example, a grommet, configured to receive the first speaker and the second speaker and to seal the first speaker and the second speaker.

Embodiments of the present invention will now be described with reference to the schematic block diagram illustration of a mobile terminal in FIG. 1. FIG. 1 illustrates an exemplary radiotelephone communication system, in accordance with embodiments of the present invention, which includes a mobile terminal 22 configured to communicate with a base station transceiver 24 of a wireless communications network. The mobile terminal 22 includes a portable housing 23 and may include a keyboard/keypad 26, a display 28, a speaker assembly 32, a microphone 34, a transceiver 36, and a memory 38 that communicate with a controller/processor 42. The transceiver 36 typically includes a transmitter circuit 44 and a receiver circuit 46, which respectively transmit outgoing radio frequency signals to the base station transceiver 24 and receive incoming radio frequency signals, such as voice or other audio signals, from the base station transceiver 24 via an antenna 48. The radio frequency signals transmitted between the mobile terminal 22 and the base station transceiver 24 may comprise both traffic and control signals (e.g., paging signals/messages for incoming calls), which are used to establish and maintain communication with another party or destination.

The controller/processor 42 may support various functions of the mobile terminal 22, including decoding received audio signals from the receiver circuit 42 and selectively providing the decoded audio signals to the speaker assembly 32. As shown in FIG. 1, musical instrument digital interface (MIDI) signals may be supplied to the speaker 32 by a MIDI synthesizer 35 for polyphonic signals, alerting and/or user feedback. Alternatively, synthesizers for other formats may be provided.

The foregoing components of the mobile terminal 22, other than the speaker assembly 32, may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer, that may include a radiotelephone transceiver, or other portable device using a speaker in a space constrained housing configuration.

The base station transceiver 24 is typically a radio transceiver(s) that defines an individual cell in a cellular network and communicates with the mobile terminal 22 and other mobile terminals in the cell using a radio-link protocol. Although only a single base station transceiver 24 is shown, it will be understood that many base station transceivers may be connected through, for example, a mobile switching center and other devices to define a wireless communications network.

Although the present invention may be embodied in communication devices or systems, such as the mobile terminal 22, it will be understood that the present invention is not limited to such devices and/or systems. Instead, the present invention may be embodied in any apparatus that utilizes a micro-speaker and generates a range of sounds for different purposes, in particular, handheld devices.

Figure 2:
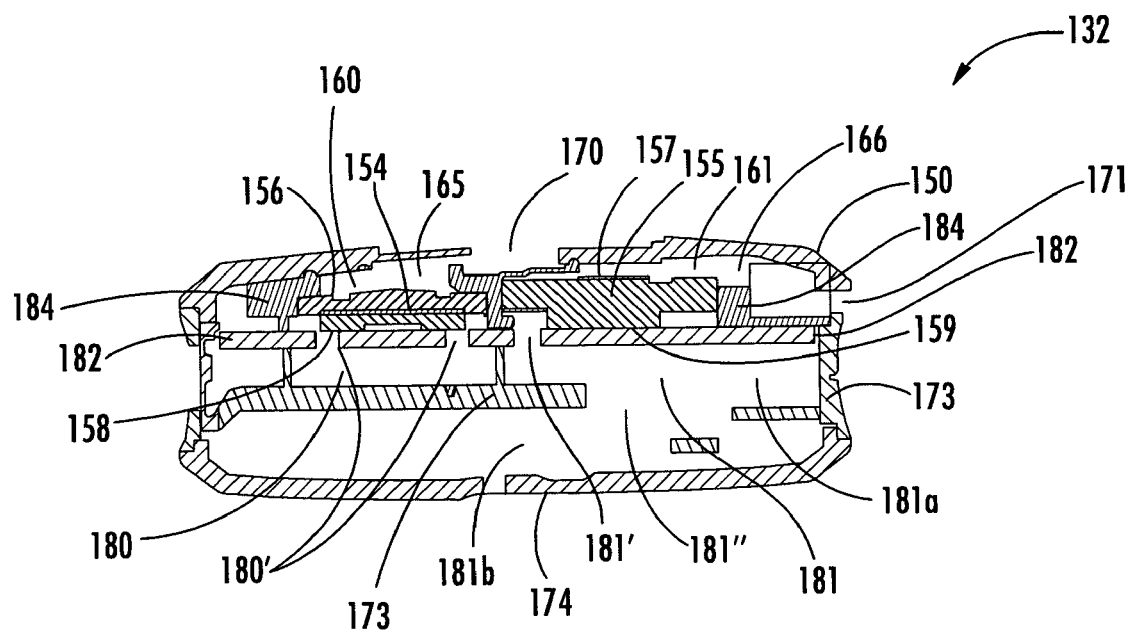
FIG. 2 is a cross-sectional view illustrating a speaker assembly according to some embodiments of the present invention.

A speaker assembly according to embodiments of the present invention will now be further described with reference to the schematic block diagram illustration of FIG. 2. As shown in the embodiments of FIG. 2, the speaker assembly 132 includes a first speaker 154 and a second speaker 155 positioned in a portable housing 150. Only a portion of the housing 150 is shown in FIG. 2 and the housing 150 may include other components that are not directly related to the speaker assembly 132. It will be understood that in some embodiments of the present invention, the first speaker 154 may be a receiver speaker and the second speaker 155 may be a micro-speaker. The receiver speaker may have a DC resistance of about 32 ohms and the micro-speaker may have a DC resistance of about 8 ohms. A receiver speaker may, for example, be used to deliver audio to an earpiece and a micro-speaker may, for example, be used to deliver alerting tones to a user as discussed further herein. Furthermore, in some embodiments of the present invention a micro-speaker may include one or more functionalities of a receiver speaker and/or a receiver speaker may include one or more functionalities of a micro-speaker without departing from the teachings of the present invention.

The first speaker 154 includes a front face 156 and a back face 158 positioned opposite from the front face 156. The rear face of a speaker typically refers to the face adjacent the transducer/coil components of the speaker. However, in various embodiments of the present invention the speaker or speakers may be reverse mounted and, as used herein, "front face" will refer to the face of the speaker associated with the forward or high frequency tuning volume and "rear face" will refer to the face of the speaker associated with the back or low frequency tuning volume. As shown in FIG. 2, an acoustic passageway defining a first high frequency forward tuning volume 160 is located adjacent the front face 156 of the first speaker 154. A passageway 165 extends from the first forward tuning volume 160 to an opening 170 in the housing 150. The opening 170 in some embodiments of the present invention is an earpiece, for example, on the front face of the housing 150.

As shown in FIG. 2, the second speaker 155 includes a front face 157 and a back face 159 positioned opposite from the front face 157. An acoustic passageway defining a second high frequency forward tuning volume 161 is located adjacent the front face 157 of the second speaker 155. A second passageway 166 extends from the second forward tuning volume 161 to an opening 171 in the housing 150. For the embodiments illustrated in FIG. 2, the opening 171 is in the side of the housing 150.

It will be understood that the frequency response of the first speaker 154 and/or the second speaker 155 may be tuned to provide an amplitude response in a voice frequency range and a high amplitude response, greater than the response of the voice frequency range, at an alert frequency. Such tuning for a high alert volume may be associated with the second speaker 155 to facilitate routing of such signals to a location remote from the earpiece. The first speaker and/or the second speaker may also be tuned to provide an amplitude response in an extended frequency range above the voice frequency range, for example, to support musical sounds (polyphonic).

As further illustrated in FIG. 2, the second speaker assembly further includes a first low frequency back tuning volume 180, which is coupled to the back face 158 of the first speaker 154 through openings 180' in the printed circuit board 182. The back tuning volume 180 may be acoustically closed as illustrated in FIG. 2. The first low frequency back tuning volume 180 may be, for example, a 0.5 cubic centimeter (cc) back tuning volume. The second speaker assembly further includes a second low frequency back tuning volume 181, which is coupled to the back face 159 of the second speaker 155 through openings 181' in the printed circuit board 182.

As shown in FIG. 2, the back tuning volume 181 includes a first region 181a defined between the printed circuit board 182 and a mounting member 173 and a second region 181b defined between the mounting member 173 and the planar antenna 174 with at least one opening 181" in the mounting member 173 acoustically coupling the regions 181a, 181b. The back tuning volume 181 may also be acoustically closed.

While the relative volumes of the respective tuning volumes are merely illustrative and not intended to limit the present invention, in various embodiments of the present invention, the back tuning volumes are at least an order of magnitude larger than the forward tuning volumes. In further embodiments of the present invention, the second back tuning volume 181 is at least twice as large as the first back tuning volume 180.

Referring again to FIG. 2, the speaker assembly 132 illustrated in FIG. 2 may be used as the speaker assembly 32 in a mobile terminal 22, for example, the mobile terminal 22 illustrated in FIG. 1. In such a case, the portable housing 23 of the mobile terminal 22 may serve as the housing 150 of the speaker assembly 132. It is to be further understood that, while the illustration of FIG. 2 shows a side opening 171 (porting) for the second speaker 155, the invention is not limited to such a porting and may also be ported to an opening remote from opening 170 in another face of the mobile terminal 22 without departing from the teachings of the present invention. For example, the second speaker 155 may be ported to the front face (i.e., keyboard/display face) of the mobile terminal 22 or other location selected, for example, to avoid peak acoustic exposure to high sound levels at an earpiece position of the mobile terminal 22. In further embodiments of the present invention, it will be understood that the first speaker 154 and the second speaker 155 may be ported through or integrated into other hardware of the mobile terminal 22, as well as the configuration illustrated in FIG. 2, while maintaining a desired audio performance of the speaker assembly 132.

As further illustrated in the embodiments of FIG. 2, the first speaker 154 and the second speaker 155 are electrically coupled to an electronic circuit, for example, the printed circuit board 182. The electrical connection may be provided by, for example, spring connectors/contacts (not shown) on the printed circuit board and/or on the first speaker 154 and/or the second speaker 155.

In the embodiments illustrated in FIG. 2, the first speaker 154 and the second speaker 155 are positioned in a grommet 184. The grommet 184 may be configured to provide a seal between the front face 156 and the back face 158 of the first speaker 154 and the front face 157 and the back face 159 of the second speaker 155. The grommet may also define the acoustic passageways including the first and second forward tuning volumes 160 and 161 and the first and second passageways 165 and 166.

The first speaker 154 and the second speaker 155, in various embodiments of the present invention, may have a diameter of from about 10 millimeters (mm) to about 20 mm. In certain embodiments, the opening 171 may have an area of less than about 10 square millimeters ($mm^2$). Such a small port size may be about half the size, or less, of typical existing porting strategies for micro-speakers. The use of such smaller porting size openings for the opening 171 may, for example, be desirable to reduce audio interference or detraction from the appearance of the mobile terminal 22 or other device in which the speaker assembly 132 is located.

Figure 3:
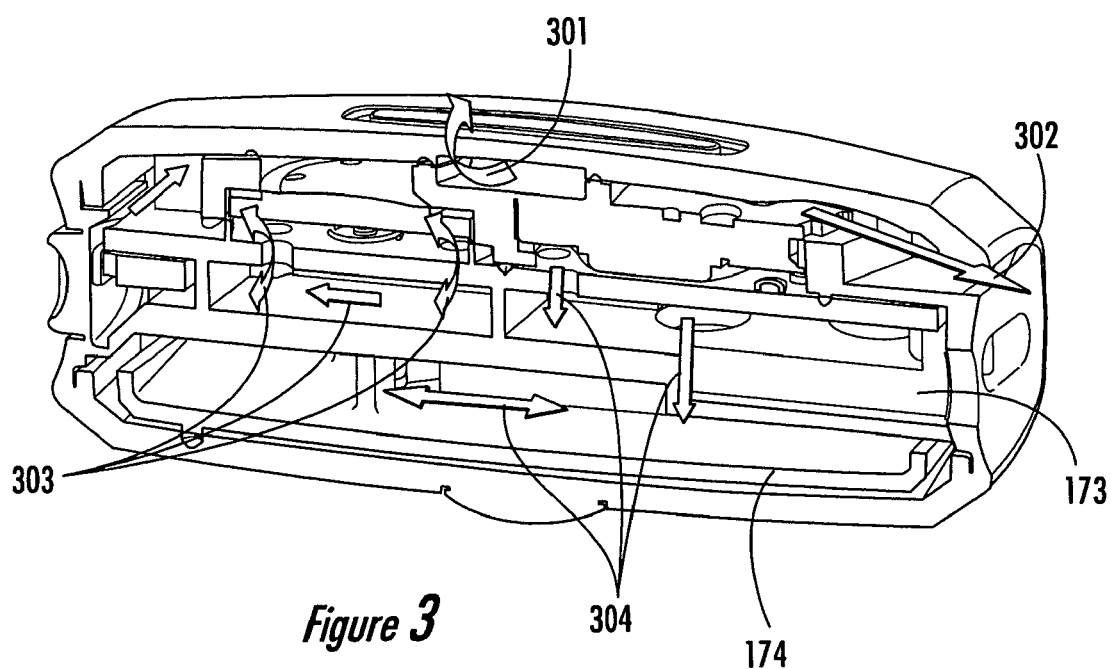
FIG. 3 is a perspective diagram illustrating acoustic paths of forward tuning volumes and back tuning volumes according to some embodiments of the present invention.

Referring now to FIGS. 2 and 3, the porting paths of the first and second forward tuning volumes and first and second back tuning volumes will be further described. The porting path of the first forward tuning volume 160 through the first passageway 165 is illustrated by a first arrow 301, i.e. out opening 170. The porting path of the second forward tuning volume 161 through the second passageway 166 is illustrated by arrow 302, i.e. out opening 171. The porting path of the first back tuning volume 180 is illustrated by a third set of arrows 303. As illustrated, opening(s) 180' in the printed circuit board 182 acoustically couple the back face 158 of the first speaker 154 to the first back tuning volume 180, which is defined by the mounting member 173. Similarly, the porting path of the second back tuning volume 181 is illustrated by a fourth set of arrows 304. As illustrated, opening(s) 181' in the printed circuit board 182 acoustically couple the back face 159 of the second speaker 155 to a first region 181a of the second back tuning volume 181. Opening(s) 181" in the mounting member 173 acoustically couple the first region 181a to a second region 181b of the second back tuning volume 181 defined by the planar antenna 174 and the mounting member 173.

Speaker assemblies according to embodiments of the present invention may provide a dual speaker assembly including a first speaker and a second speaker on a same side of the printed circuit board adjacent one another. This may allow the overall size of the device to be reduced or may allow additional components providing additional functionalities to be included in the device. Furthermore, as discussed above, the first speaker and the second speaker may each have dedicated front and back volumes, which may substantially isolate the speakers and may reduce acoustic coupling between the speakers. The addition of the grommet for providing a seal as discussed above may also contribute to the reduction of acoustic coupling and the isolation of the speakers. Accordingly, the amount of acoustic handset echo experienced by the user may be reduced resulting from the reduction of acoustic coupling of the speakers, i.e. no intentional leakage past the earpiece. It will be understood that the isolation of the acoustic passages may both reduce echo from sounds generated by the receiver speaker passing out of the micro-speaker passageways and reduce sounds generated by the micro-speaker from passing into the acoustic passageways of the receiver speaker and introducing potentially high volume signals directly to the earpiece.

It will be understood that the first speaker and/or the second speaker according to embodiments of the present invention may have a tuning volume used to extend to high frequencies. Speaker assemblies and mobile terminals including speaker assemblies utilizing the tuning volume to extend to high frequencies are discussed in commonly assigned U.S. patent application Ser. No. 10/449,523 entitled Reverse Mounted Micro-Speaker Assemblies and Mobile Terminals including the Same, filed May 30, 2003, and commonly assigned U.S. patent application Ser. No. 10/256,745 entitled Double-Resonator Micro-Speaker Assemblies and Methods for Tuning the Same, filed Sep. 27, 2002, the disclosures of which are hereby incorporated herein by reference as if set forth in their entirety.

Figure 4:
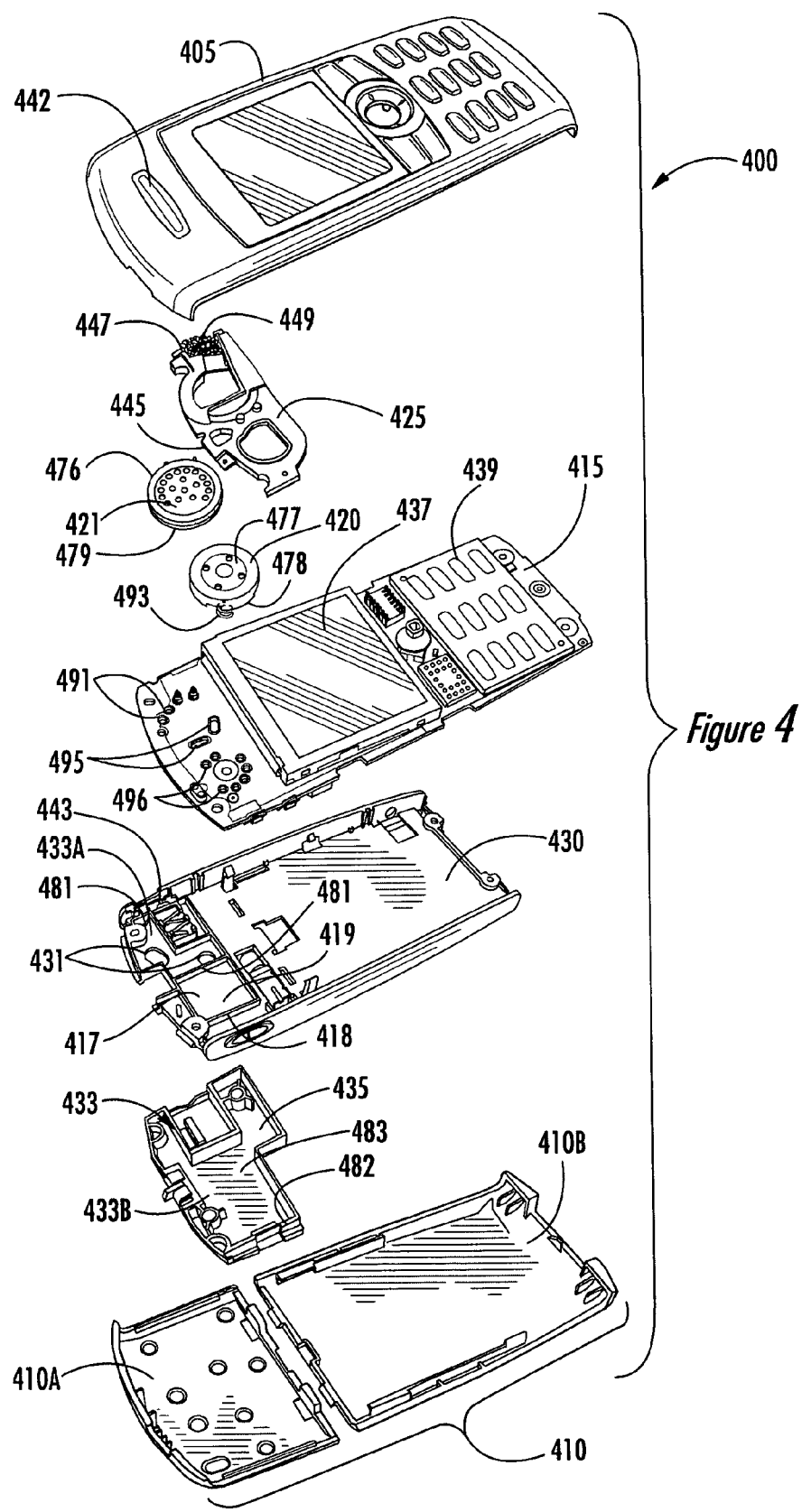
FIG. 4 is an exploded perspective view of a mobile terminal including a speaker assembly according to some embodiments of the present invention.

Further embodiments of the present invention will now be described with reference to FIGS. 4 through 8. FIG. 4 is an exploded perspective view of a mobile terminal 400 including a speaker assembly according to some embodiments of the present invention. As illustrated in FIG. 4, the mobile terminal 400 includes a front cover 405 (front face) and a back cover 410 (back face) that mate with a mounting member 430 to define a handheld portable housing of the mobile terminal 400. A printed circuit board 415, a first speaker 420, a second speaker 421, a grommet 425 and a planar antenna 435 are positioned in the housing.

The printed circuit board 415 may include and/or be coupled to user input/output devices such as a display 437 and a keyboard or keypad 439 on a first side of the printed circuit board 415. As further illustrated for the embodiments shown in FIG. 4, the first speaker 420 and the second speaker 421 are also electrically coupled to the first side of the printed circuit board 415. The first side of the printed circuit board 415 may be a front side of the printed circuit board, i.e. a side including the display 437 and keypad 439 as shown in FIG. 4 or may, alternatively, be a back side of the printed circuit board, i.e., a side remote from the display 437 and keypad 439 without departing from the teachings of the present invention.

Spring connectors or contacts 491 on the first side of the printed circuit board 415 may be used to electrically couple the second speaker 421 to the first side of the printed circuit board 415. Furthermore, a spring connector 493 on the back face 478 of the first speaker 420 may be used to electrically couple the first speaker 420 to the first side of the printed circuit board 415. As shown in FIG. 4, the first speaker 420 and the second speaker 421 are positioned between the printed circuit board 415 and the front cover 405 of the housing. An opening 442 in the front cover 405 is positioned adjacent the first speaker 420 to provide an earpiece for a user of the mobile terminal 400.

Figure 7:
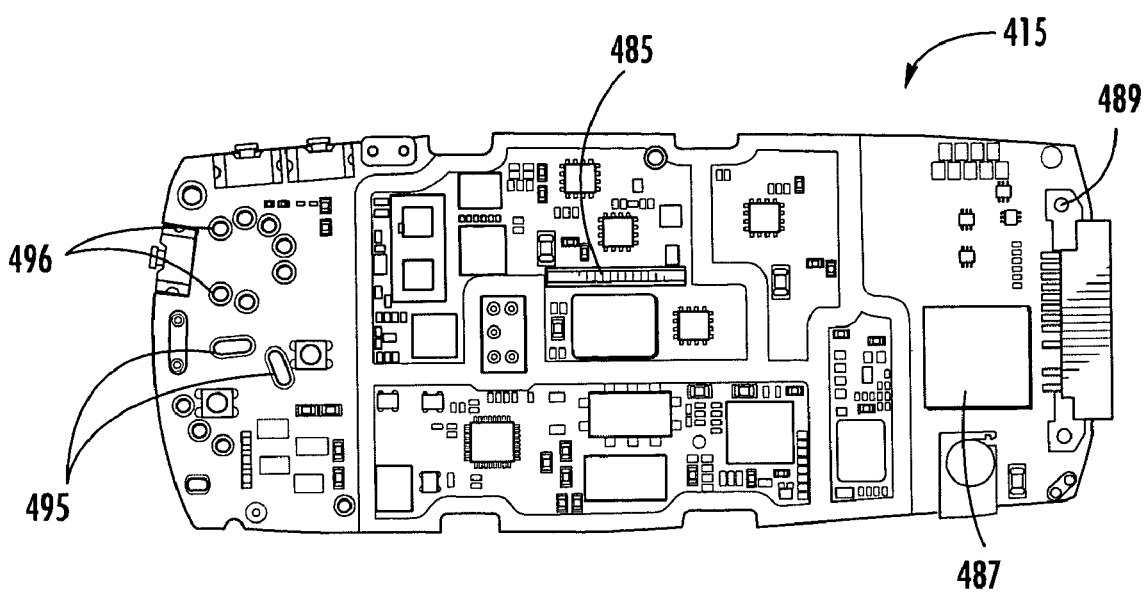
FIG. 7 is a bottom view of the printed circuit board of FIG. 4 according to some embodiments of the present invention.

As shown in FIG. 7, the printed circuit board 415 may also include various components associated with a second side of the printed circuit board 415 opposite the first side of the printed circuit board 415. A receiver 485 that receives audio signals from a wireless communications network is illustrated mounted on the second side of the printed circuit board 415. A controller 487 decodes the audio signals and selectively provides the decoded audio signals to the first speaker 420 and/or the second speaker 421. A system connector 489 on the printed circuit board 415 extends through the housing of the mobile terminal 400 to allow access to the circuitry on the printed circuit board 415, for example, for use by an auxiliary component coupled to the system connector 489.

Figure 5:
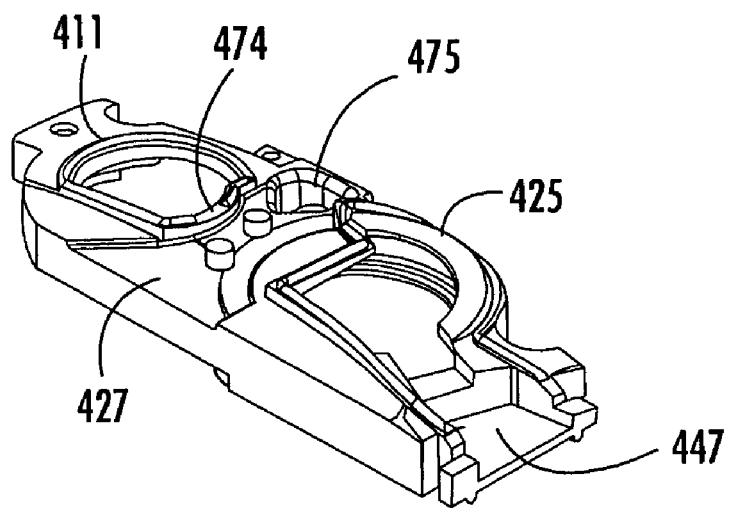
FIG. 5 is a perspective view of a grommet according to some embodiments of the present invention.

Referring again to FIG. 4, the grommet 425 is configured to receive the first speaker 420 and the second speaker 421 and provide a seal between the front 477 and back 478 faces of the first speaker 420 and between the front 476 and back 479 faces of the second speaker 421. As illustrated in FIG. 5, the grommet 425 may be a unitary molded member that is configured to receive the first speaker 420 and the second speaker 421 and to provide a seal as discussed above. It will be understood that the grommet 425 illustrated in FIG. 5 is provided for exemplary purposes only and that embodiments of the present invention are not limited to this configuration. For example, the functionality of the grommet may be provided by a first member configured to receive and seal the first speaker 420 and a separate second member configured to receive and seal a second speaker 421 without departing from the teachings of the present invention.

Figure 6:
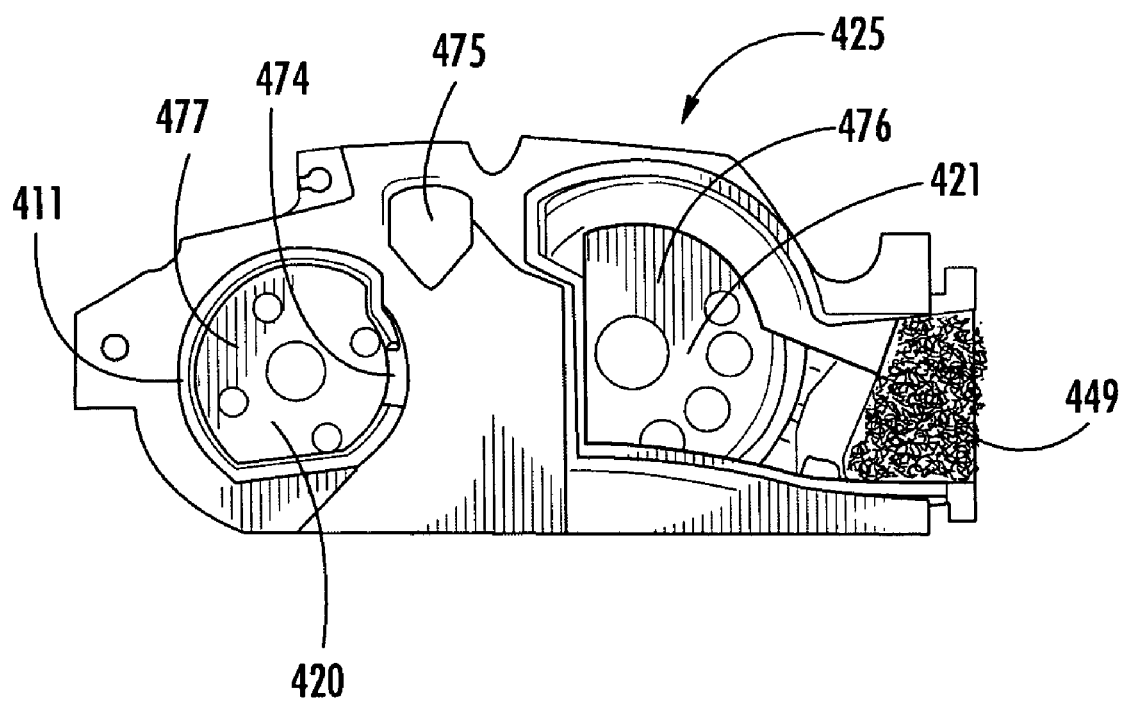
FIG. 6 is a top view of a speaker assembly according to some embodiments of the present invention.

The first speaker 420 and the second speaker 421 are illustrated in FIG. 6 positioned in the grommet 425 illustrated in FIG. 5. The surface of the grommet illustrated in FIG. 6 is the surface of the grommet that contacts the front face 405 of the housing when positioned in the housing. Thus, the front face 477 of the first speaker 420 and the front face 476 of the second speaker 421 are illustrated in FIG. 6. The grommet illustrated in FIG. 6 further includes an opening 475 that acoustically couples the first forward tuning volume to the first back volume.

Referring again to FIG. 4, the grommet 425 further defines a first forward tuning volume 445 adjacent the front face 477 of the first speaker 420. The grommet 425 and the front face 405 of the housing further define a first passageway 165 (FIG. 2) acoustically coupling the first forward tuning volume 445 to an earpiece opening 442 in the front cover 405 of the housing. The grommet 425 further defines a second passageway 166 (FIG. 2) defining a second forward tuning volume 447 acoustically coupling the front face 476 of the second speaker 421 to an opening 443 in a face of the housing remote from the earpiece 442. In the illustrated embodiments, the opening 443 is in the side face of the mounting member 430. In certain embodiments of the present invention, as illustrated, for example, in FIGS. 4 and 6, a filter 449 may be placed in the opening 443 to filter debris. The filter 449 may be, for example, a foam filter.

As shown in FIG. 4, the printed circuit board 415 further includes at least one opening 496 adjacent the back face 478 of the first speaker 420 extending through the printed circuit board to a first back volume 417 defined by the mounting member 430. The at least one opening 496 acoustically couples the back face 478 of the first speaker 420 to the first back tuning volume 417 having sidewalls 418 and a back wall 419 defined by the mounting member 430. As illustrated in FIG. 4, the first back tuning volume 417 may be a closed back volume and a seal between the sidewalls 418 of the mounting member 430 and the printed circuit board 415 may be, for example, a plastic-to-plastic seal. An adhesive layer may also be provided therebetween to facilitate sealing.

Figure 10:
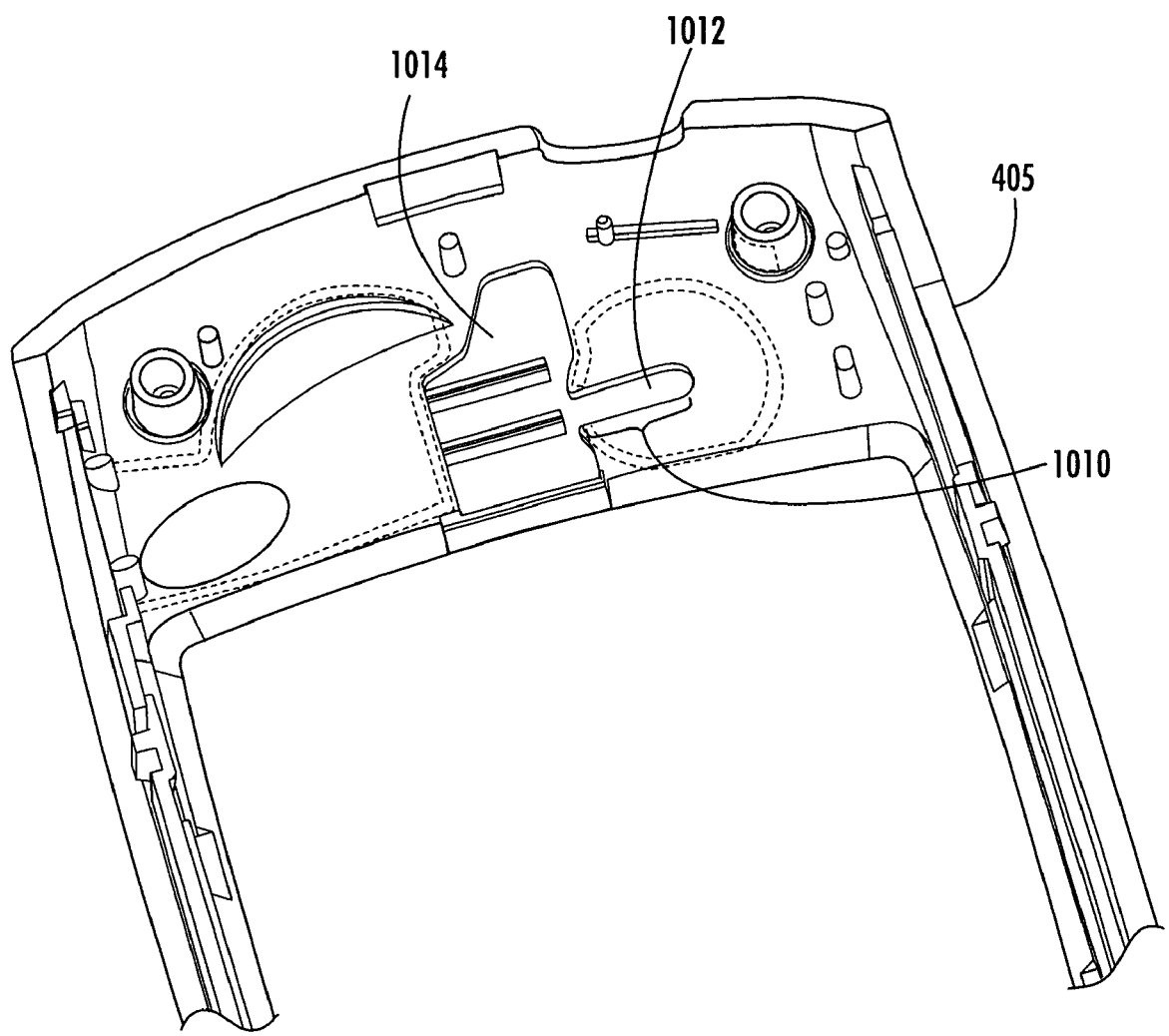
FIG. 10 is a bottom perspective view of the front cover of FIG. 4 according to some embodiments of the present invention.

Referring now to FIGS. 4, 6 and 10, in certain embodiments of the present invention the grommet 425 may further include an opening 475 that acoustically couples the first back tuning volume 417 to the first forward tuning volume 445, i.e. acoustically couples the back face 478 of the first speaker 420 to the first forward tuning volume 445. Thus, the grommet 425 and the front face 405 of the housing may define the first passageway 165 (FIG. 2) acoustically coupling both the first forward tuning volume 445 and the first back tuning volume 417 to an earpiece opening 442 in the front cover 405 of the housing. In these embodiments of the present invention, the first forward tuning volume 445 may be, for example, a 0.15 cubic centimeter (cc) forward tuning volume.

In certain embodiments of the present invention, the grommet 425 may further include a slit 474 in a seal member 411 around the first speaker 420. The slit 474 may be configured to align with a groove 1012 (FIG. 10) in the front cover 405 of the housing and may define a third passageway 1010 that acoustically couples the front face 477 of the first speaker 420 to the first forward tuning volume 445. The groove 408 in the front cover 405 of the housing may have a width of about 1.8 mm, a depth of about 0.5 mm and a length of about 10 mm. The slit 474 may also have a width of about 1.8 mm such that it will mate with the groove 408. It will be understood that a grommet 425 according to some embodiments of the present invention may include the opening 475 and the slit 474 in the seal member 411 or may just include the slit 474 or the opening 475 without departing from the teachings of the present invention. Furthermore, in some embodiments of the present invention, a depression 1014 in the front cover 405 of the housing illustrated in FIG. 10 may further define the first forward tuning volume 445.

Figure 8:
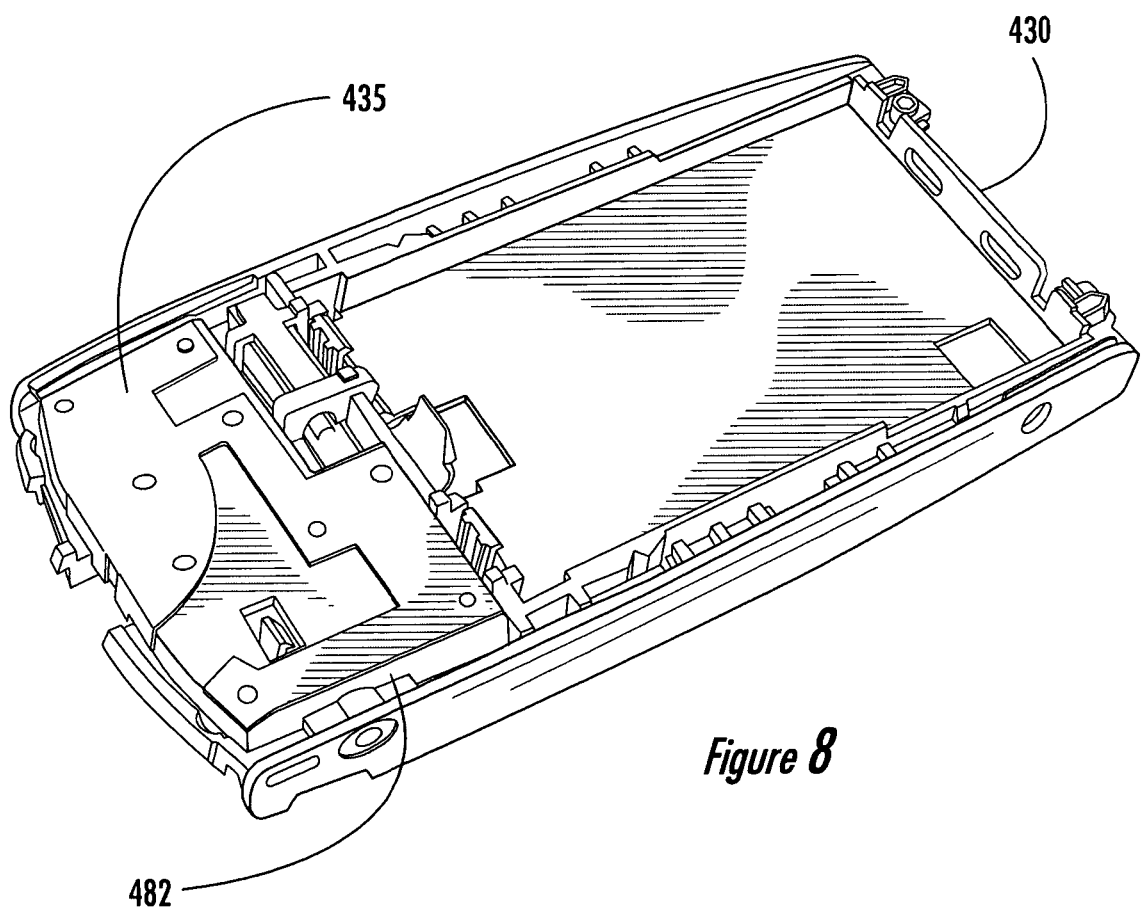
FIG. 8 is a bottom perspective view of the mounting member and planar antenna of FIG. 4 according to some embodiments of the present invention.

As illustrated in the embodiments of FIGS. 4 and 8, a planar antenna 435, which is electrically coupled to the printed circuit board 415, is positioned at a selected distance from the printed circuit board 415, when the mobile terminal 400 is assembled. The printed circuit board 415 defines a ground plane for the planar antenna 435 and the antenna 435 may be positioned substantially parallel to the ground plan at a distance selected to provide a desired frequency response for the planar antenna 435. It will also be understood that a "planar" antenna, as that term is used herein, need not be entirely planar and may be, for example, curved conformally with the housing of the mobile terminal 400.

A shown in FIG. 4, the planar antenna 435 is positioned between the mounting member 430 and a first portion 410A of the back cover 410 of the housing. A plastic-to-plastic seal is provided between the planar antenna 435 and sidewalls 482 on a bottom side of the mounting member 430 to define an acoustically closed region of a second back tuning volume for the second speaker 421. However, it will be understood that other seal means may be used in various embodiments of the present invention, such as an adhesive. Furthermore, while illustrated as having sidewalls provided by the mounting member 430 in FIG. 5, it will be understood that, in other embodiments of the present invention, the sidewalls 482 may be provided as features of the planar antenna 435 and/or as features of both the mounting member 430 and the planar antenna 435 and the sidewalls 418 may alternatively and/or additionally be provided as features of the printed circuit board 415.

As further illustrated in FIG. 4, the printed circuit board 415 further comprises at least one opening 495 extending through the printed circuit board adjacent a back face of the second speaker 421 to a first region 433A of the second back volume 433. Furthermore, the mounting member 430 may also include at least one opening 431 through the mounting member 430 to the second region 433B of the second back volume 433. The at least one opening 496 in the printed circuit board 415 and the at least one opening 431 in the mounting member 430 acoustically couple the back face of the second speaker 421 with the second back tuning volume 433. The first region 433A of the second back tuning volume 433 is defined by the printed circuit board 415 and the mounting member 430, including sidewalls 481 on a front face of the mounting member 430. The second region 433B of the second back tuning volume 433 is defined by the mounting member 430 and the planar antenna 435, including sidewalls 482 on the bottom side of the mounting member 430 (FIG. 8). As illustrated in FIGS. 4 and 8, the second back tuning volume 433 may be a closed back volume and a seal between the mounting member 430 and the printed circuit board 415 and/or the planar antenna 435 may be a plastic-to-plastic seal.

The mounting member 430 may be an insulating material such as Cycoloy® available from GE Plastics. The grommet 425 may also be an insulating material and maybe a more compliant material such as silicon rubber to facilitate sealable engagement of the first speaker 420 and the second speaker 421 in the grommet 425 (FIG. 6) and to facilitate placement of the grommet 425 into the mobile terminal. Furthermore, while various electronic circuits, such as the receiver 485 and controller 487 are shown as mounted on the second face of the printed circuit board 415 in FIG. 7, it is to be understood that the second face may be the front face of the printed circuit board 415, i.e. the face oriented toward the keyboard, or the back face of the printed circuit board opposite the front face of the printed circuit board 415. Furthermore, the components illustrated on the printed circuit board 415 may be positioned on different sides of the printed circuit board 415 in various embodiments of the present invention.

As briefly described above, a first speaker and a second speaker are provided in a sealed member, for example, a grommet, on the same face of an electronic circuit, for example, a printed circuit board. Providing the first speaker and the second speaker on the same side of the printed circuit board may allow the size of the device to be decreased or the inclusion of more components in the same size device. Furthermore, providing distinct forward and back tuning volumes having no intentional leakage may reduce the acoustic coupling experienced by the speakers. Thus, acoustic echo caused by the acoustic coupling of the speakers may be reduced according to some embodiments of the present invention.

Figure 9:
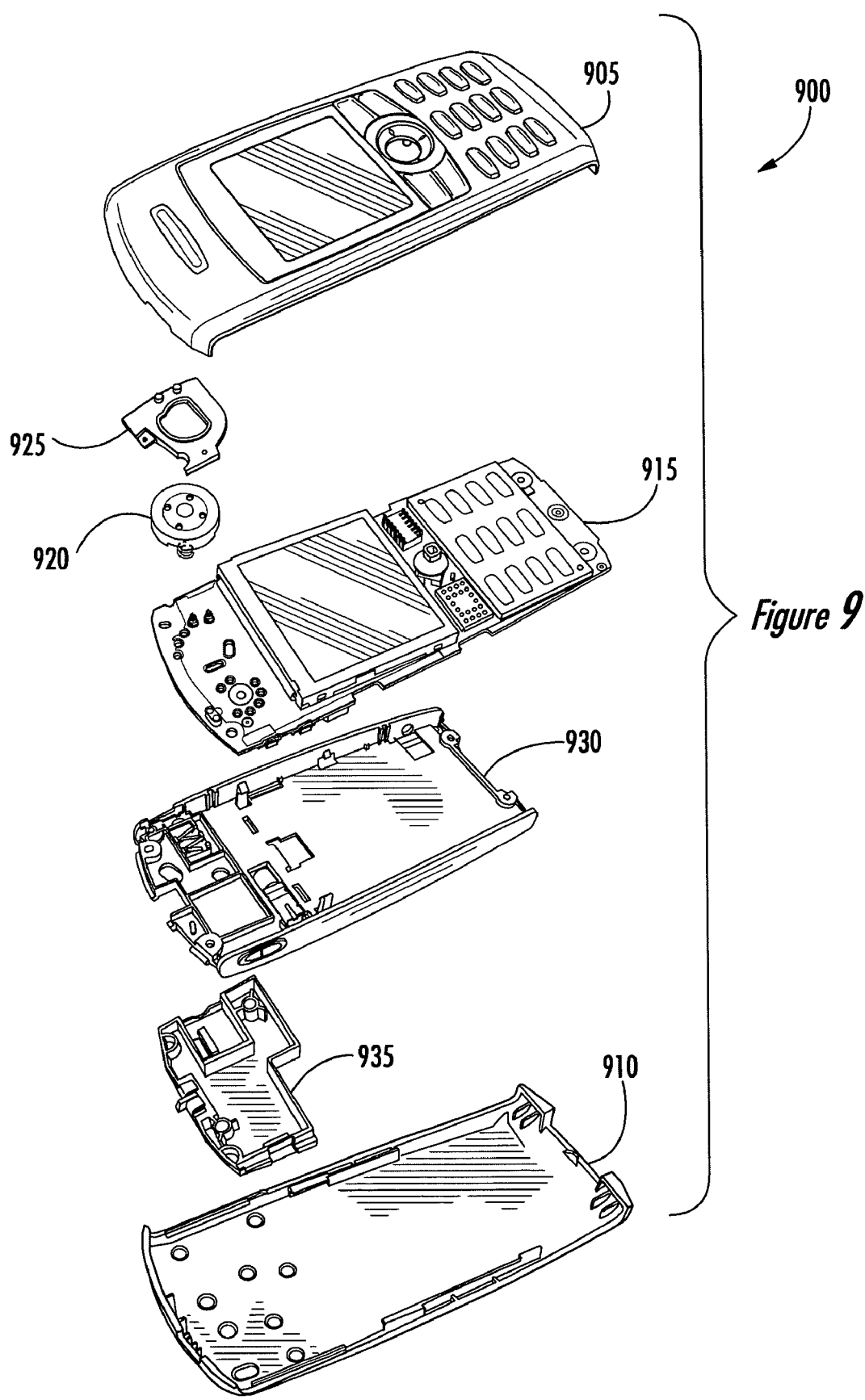
FIG. 9 is an exploded perspective view of a mobile terminal including a sealed speaker assembly according to other embodiments of the present invention.

Embodiments including a single speaker, in a mobile terminal 900 according to the present invention are illustrated in FIG. 9. In some embodiments of the present invention, the single speaker may be a receiver speaker or a micro-speaker configured to include the functionality of a receiver speaker and a micro-speaker. As shown in FIG. 9, a speaker 920 is positioned in a grommet 925. The grommet 925 is configured to form at least part of front and back acoustic passageways for the speaker 920. The grommet 925 may further be configured to sealably engage the front cover 905 of the mobile terminal 900 and the printed circuit board 915, which may provide additional walls of respective acoustic passageways. The grommet 925 is configured to provide seals on acoustic passageways associated with the speaker between a front face and a back face of the speaker, between the front face of the housing and the front face of the speaker and between the back face of the speaker and the first side of the electronic circuit. As a result, acoustic echo in the housing may be suppressed by reducing leakage from the acoustic passageways past the earpiece. It is to be understood that the acoustic passageways include a forward acoustic passageway acoustically coupling the speaker to the earpiece and that audio signals directed thereto are not considered leakage as that term is used herein. As shown in FIG. 9, the mobile terminal 900 further includes a mounting member 930, planar antenna 935 and bottom cover 910 that are operate generally as described previously with reference to similarly numbered (e.g., 930 to 430) items in the embodiments of FIG. 4 and various combinations of regions defining back volumes may be provided by such components for the embodiments of FIG. 9 depending on the desired characteristics of the low frequency back tuning volume.

In the drawings and specification, there have been disclosed typical illustrative embodiments of the invention and, although specific terms are employed, they are used in a generic and descriptive sense only and not for purposes of limitation, the scope of the invention being set forth in the following claims.

The invention claimed is:

1. A mobile terminal comprising:
a housing;
an electronic circuit positioned in the housing;
a first speaker positioned adjacent a first side of the electronic circuit;
a second speaker positioned adjacent the first speaker on the first side of the electronic circuit;
a grommet positioned in the housing that is configured to receive the first speaker and the second speaker, wherein the first speaker and the second speaker are positioned in the grommet, wherein the grommet is configured to provide a seal between a front face of the first speaker and a back face of the first speaker and between a front face of the second speaker and a back face of the second speaker and wherein the housing comprises a front face including a keypad and an earpiece and wherein the first speaker and the second speaker are positioned between the electronic circuit and the front face and wherein the electronic circuit comprises a printed circuit board, the mobile terminal further comprising a first passageway acoustically coupling the front face of the first speaker to the earpiece; and
a second passageway acoustically coupling the front face of the second speaker to an opening in a face of the housing remote from the earpiece, wherein the first passageway includes a first high frequency forward tuning volume adjacent the front face of the first speaker and wherein the second passageway includes a second high frequency forward tuning volume adjacent the front face of the second speaker, the mobile terminal further comprising:
a first low frequency back tuning volume adjacent the back face of the first speaker; and
a second low frequency back tuning volume adjacent the back face of the second speaker.

2. The mobile terminal of claim 1, wherein the first speaker comprises a receiver speaker and the second speaker comprises a micro-speaker.

3. The mobile terminal of claim 2, wherein the receiver speaker has a DC resistance at least about two times a DC resistance of the micro-speaker.

4. The mobile terminal of claim 3, wherein the DC resistance of the receiver speaker is about 32 ohms and the DC resistance of the micro-speaker is about 8 ohms.

5. The mobile terminal of claim 1 further comprising a seal between a first face of the grommet and the front face of the housing and a seal between a second face of the grommet and the first side of the primed circuit board.

6. The mobile terminal of claim 1 wherein the grommet defines the first and second passageways.

7. The mobile terminal of claim 1 wherein the opening remote from the earpiece is positioned on a side face of the housing.

8. The mobile terminal of claim 1, wherein the grommet further comprises an opening extending through the grommet that acoustically couples the first forward tuning volume and the first low frequency back tuning volume and wherein the first passageway acoustically couples the front face of the first speaker and the back face of the first speaker to the earpiece.

9. The mobile terminal of claim 1, wherein the grommet further includes a seal member between a face of the grommet adjacent the front face of the first speaker and the front face of the housing and wherein the seal member includes a slit and wherein a bottom of the front face of the housing includes a groove adjacent the front face of the first speaker and wherein the slit is configured to align with the groove to define a third passageway that acoustically couples the from face of the first speaker and the first forward tuning volume.

10. The mobile terminal of claim 1 further comprising:
a mounting member between the front face of the housing and a back face of the housing, wherein the printed circuit board is positioned between the front face of the housing and the mounting member.

11. The mobile terminal of claim 10 further comprising at least one opening extending through the printed circuit board adjacent the back face of the first speaker that acoustically couples the back face of the first speaker to a region of the first back tuning volume defined by the printed circuit board and the mounting member.

12. The mobile terminal of claim 10, further comprising a planar antenna positioned in the housing between the mounting member and the back face of the housing.

13. The mobile terminal of claim 12 further comprising at least one opening extending through the printed circuit board adjacent the back face of the second speaker that acoustically couples the back face of the second speaker to a first region of the second back tuning volume defined by the printed circuit board and the mounting member.

14. The mobile terminal of claim 13 further comprising a second region of the second back tuning volume defined by the mounting member and the planar antenna and at least one opening extending through the mounting member between the first region and the second region of the second back tuning volume.

15. The mobile terminal of claim 14 further comprising at least one opening extending through the printed circuit board adjacent the back face of the first speaker that acoustically couples the back face of the first speaker to a region of the first back tuning volume defined by the printed circuit board and the mounting member.

16. The mobile terminal of claim 14 wherein the grommet is configured to provide seals for the first passageway and the second passageway and the first back tuning volume and the second back tuning volume to suppress acoustic echo in the housing by reducing leakage from the second passageway and the first and second back tuning volumes past the earpiece.

17. The mobile terminal of claim 14 further comprising a seal between a second side of the printed circuit board and a first face of the mounting member that substantially closes the first back tuning volume and seals between a second side of the printed circuit board and a first face of the mounting member and between a first face of the planar antenna and a second face of the mounting member that substantially closes the second back tuning volume.

18. The mobile terminal of claim 17 wherein the seal between the second side of the printed circuit board and the first face of the mounting member comprises a plastic to plastic seal and the seals between a second side of the printed circuit board and a first face of the mounting member and between a first face of the planar antenna and a second face of the mounting member comprise a plastic to plastic seal.

19. The mobile terminal of claim 18 wherein at least one of the seals between the printed circuit board and the planar antenna and the mounting member further comprises an adhesive layer.

20. The mobile terminal of claim 12 wherein the printed circuit board defines a ground plane and wherein the planar antenna is substantially parallel to and electrically coupled to the printed circuit board and positioned at a selected distance from the ground plane to provide a desired frequency response of the planar antenna.

21. The mobile terminal of claim 1 further comprising:
at least one spring connector that electrically couples the first speaker to the first side of the electronic circuit; and
at least one spring connector that electrically couples the second speaker to the first side of the electronic circuit.

22. The mobile terminal of claim 1 wherein the first speaker and the second speaker have a diameter of from about 10 millimeters (mm) to about 20 mm.

23. The mobile terminal of claim 1 further comprising;
a receiver that receives encoded audio signals from a wireless communications network; and
a controller that decodes the received audio signals and selectively provides the decoded audio signals to the first and/or the second speaker.

24. A mobile terminal comprising:
a housing;
an electronic circuit positioned in the housing;
a first speaker positioned adjacent a first side of the electronic circuit;
a second speaker positioned adjacent the first speaker on the first side of the electronic circuit;
a grommet positioned in the housing that is configured to receive the first speaker and the second speaker, wherein the first speaker and the second speaker are positioned in the grommet, wherein the grommet is configured to provide a seal between a front face of the first speaker and a back face of the first speaker and between a front face of the second speaker and a back face of the second speaker and wherein the housing comprises a front face including a keypad and an earpiece and wherein the first speaker and the second speaker are positioned between the electronic circuit and the front face and wherein the electronic circuit comprises a printed circuit board, mobile terminal farther comprising a first passageway acoustically coupling the front face of the first speaker to the earpiece; and
a second passageway acoustically coupling the front face of the second speaker to an opening in a face of the housing remote from the earpiece, wherein the opening remote from the earpiece has an area of less than about 10 square millimeters (mm$^2$).

25. A mobile terminal comprising:
a housing:
an electronic circuit positioned in the housing;
a first speaker positioned adjacent a first side of the electronic circuit;
a second speaker positioned adjacent the first speaker on the first side of the electronic circuit;
a grommet positioned in the housing that is configured to receive the first speaker and the second speaker, wherein the first speaker and the second speaker are positioned in the grommet, wherein the grommet is configured to provide a seal between a front face of the first speaker and a back face of the first speaker and between a front face of the second speaker and a back face of the second speaker and wherein the housing comprises a front face including a keypad and an earpiece and wherein the first speaker and the second speaker are positioned between the electronic circuit and the front face and wherein the electronic circuit comprises a printed circuit board, the mobile terminal further comprising a first passageway acoustically coupling the front face of the first speaker to the earpiece;
a second passageway acoustically coupling the front face of the second speaker to an opening in a face of the housing remote from the earpiece; and
a filter in the opening remote from the earpiece.

26. The mobile terminal of claim 25 wherein the filter comprises a foam insert.

27. A mobile terminal comprising:
a housing:
an electronic circuit positioned in the housing;
a first speaker positioned adjacent a first side of the electronic circuit;

a second speaker positioned adjacent the first speaker on the first side of the electronic circuit;

a grommet positioned in the housing that is configured to receive the first speaker and the second speaker, wherein the first speaker and the second speaker are positioned in the grommet and wherein the grommet comprises:

a first member configured to receive the first speaker and to provide a seal between a front face of the first speaker and a back face of the first speaker; and a second member configured to receive the second speaker and to provide a seal between a front face of the second speaker and a back face of the second speaker, wherein the first and second members comprise a unitary member.

28. A speaker assembly comprising:

a grommet defining adjacent first and second receiving chambers;

a first speaker positioned in the first receiving chamber;

a second speaker positioned in the second receiving chamber; and wherein the grommet is configured to provide a seal between a front face of the first speaker and a back face of the first speaker and between a front face of the second speaker and a back face of the second speaker.

29. The speaker assembly of claim 28 wherein the grommet is further configured to define a first acoustic passageway extending from the first chamber to an outer face of the grommet and a second acoustic passageway extending from the second chamber to an outer face of the grommet at a location remote from the first acoustic passageway.

30. The speaker assembly of claim 29 wherein the grommet has a first face configured to provide a seal between the grommet and a substantially planar member and a second face, opposite the first face, configured to provide a seal between the grommet and a substantially planar member.

31. The speaker assembly of claim 28 wherein the grommet comprises a unitary elastomeric member.

* * * * *

UNITED STATES PATENT AND TRADEMARK OFFICE
CERTIFICATE OF CORRECTION

PATENT NO. : 7,069,061 B2  Page 1 of 1
APPLICATION NO. : 10/622398
DATED : June 27, 2006
INVENTOR(S) : Gammon et al.

It is certified that error appears in the above-identified patent and that said Letters Patent is hereby corrected as shown below:

Column 14,
Line 57 should read -- couples the front face of the first speaker and the first --

Column 16,
Line 27 should read -- further comprising a first passageway acoustically cou- --

Signed and Sealed this

Twenty-eighth Day of November, 2006

JON W. DUDAS
*Director of the United States Patent and Trademark Office*